UNITED STATES PATENT OFFICE.

WILHELM WITTER, OF HAMBURG, GERMANY.

PROCESS OF PRODUCING SOLUTION OF CYANOGEN HALIDE.

SPECIFICATION forming part of Letters Patent No. 641,571, dated January 16, 1900.

Application filed November 20, 1899. Serial No. 737,685. (No specimens.)

*To all whom it may concern:*

Be it known that I, WILHELM WITTER, a citizen of Germany, residing at Hohe Bleichen 36, Hamburg, Germany, have invented a certain new and useful Process for Producing a Solution of Cyanogen Halide, of which the following is a specification.

This invention relates to the production of a solution of cyanogen halide, such as chlorid or bromid, and is especially applicable for the production of such a solution for the extraction of precious metals from their ores. For this purpose a solution containing an alkali halide, such as chlorid or bromid, an alkali cyanid, and a magnesium salt is electrolyzed in any suitable vat without a diaphragm, the electrodes being of carbon or other suitable inert conductor. The solution produced in this manner contains cyanogen halide, an alkali salt corresponding with the original magnesium salt, and so much of this magnesium salt as has not been decomposed, while the remainder is precipitated as magnesium hydroxid. The following equations express the chemical change:

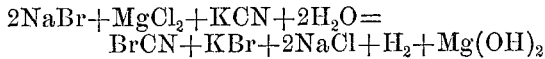

or

For the magnesium salt in the above prescription may be substituted a salt of any other suitable metal, which forms an insoluble hydroxid, the object being to prevent as much as possible the formation of oxygenated halogen salts, which would occur in an apparatus having no diaphragm if a salt of a soluble base were used.

Suitable proportions of the salts to be dissolved in making the electrolyte are such that the magnesium salt and the alkali cyanid are somewhat in excess of the molecular proportions represented by the foregoing typical equations.

When the process is applied to the regeneration of the solutions circulating through the leaching-vats in the extracting process, it is only necessary to make up the strength of the solution by the addition of such of the salts as have been diminished in quantity during the leaching and electrolyzing processes. By electrolyzing the solution thus renovated a cyanogen chlorid or bromid solution of the original strength is obtained. The process may also be applied, however, for the generation of cyanogen halide in the leaching-vat itself, in which case the pulverized ore is mixed with a solution containing the three necessary salts—namely, alkali halide, alkali cyanide, and a salt of a suitable metal—which forms an insoluble hydroxid, and this solution is electrolyzed.

Having thus described the nature of this invention and the best means I know of carrying the same into practical effect, I claim—

The herein-described process for producing a solution of cyanogen halide by electrolyzing in a bath without a diaphragm and with inert electrodes a solution containing an alkali cyanide, an alkali halide and the salt of a metal which forms an insoluble hydroxide.

In testimony whereof I have hereunto set my hand in presence of two subscribing witnesses.

WILHELM WITTER.

Witnesses:
E. H. L. MUMMENHOFF,
OTTO W. HELLMRICH.